(12) United States Patent
Zhang et al.

(10) Patent No.: US 12,557,066 B1
(45) Date of Patent: Feb. 17, 2026

(54) TECHNOLOGIES FOR CELLULAR POSITIONING

(71) Applicant: Apple Inc., Cupertino, CA (US)

(72) Inventors: Wanping Zhang, San Jose, CA (US); Faraz Faheem, Santa Clara, CA (US); Kimia Shamaei, San Jose, CA (US); Kirk Burroughs, Alamo, CA (US); Kumar Gaurav Chhokra, San Mateo, CA (US); Sachin J. Sane, San Jose, CA (US); Sooyoung Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 18/114,788

(22) Filed: Feb. 27, 2023

Related U.S. Application Data

(60) Provisional application No. 63/316,729, filed on Mar. 4, 2022.

(51) Int. Cl.
*H04W 64/00* (2009.01)
*H04W 8/20* (2009.01)
*H04W 74/0836* (2024.01)

(52) U.S. Cl.
CPC ........... *H04W 64/003* (2013.01); *H04W 8/20* (2013.01); *H04W 74/0836* (2024.01)

(58) Field of Classification Search
CPC .. H04W 8/20; H04W 64/003; H04W 74/0833
USPC ...................................................... 455/456.1
See application file for complete search history.

(56) References Cited

U.S. PATENT DOCUMENTS

| 2018/0324552 | A1* | 11/2018 | Kumar | H04W 4/027 |
| 2021/0167903 | A1* | 6/2021 | Venkatachari | H04L 5/001 |
| 2022/0053586 | A1* | 2/2022 | Purkayastha | H04W 76/11 |

OTHER PUBLICATIONS

3rd Generation Partnership Project; Technical Specification Group Radio Access Network; NR; NR and NG-RAN Overall Description; Stage 2 (Release 16), 3GPP TS 38.300 V16.8.0, Dec. 2021, 152 pages.
3rd Generation Partnership Project; Technical Specification Group Radio Access Network; NR; Medium Access Control (MAC) protocol specification (Release 16), 3GPP TS 38.321 V16.7.0, Dec. 2021, 158 pages.
3rd Generation Partnership Project; Technical Specification Group Radio Access Network; NR; Radio Resource Control (RRC) protocol specification (Release 16), 3GPP TS 38.331 V16.7.0, Dec. 2021, 963 pages.
3rd Generation Partnership Project; Technical Specification Group Radio Access Network; Study on scenarios and requirements of in-coverage, partial coverage, and out-of-coverage NR positioning use cases (Release 17), 3GPP TR 38.845 V17.0.0, Sep. 2021, 16 pages.

* cited by examiner

*Primary Examiner* — Joel Ajayi
(74) *Attorney, Agent, or Firm* — Kilpatrick Townsend & Stockton LLP

(57) ABSTRACT

The present application relates to devices and components including apparatuses, systems, and methods for technologies for user equipment-based cellular positioning.

15 Claims, 13 Drawing Sheets

US 12,557,066 B1

TECHNOLOGIES FOR CELLULAR POSITIONING

CROSS-REFERENCE TO RELATED APPLICATION

This application claims the benefit of U.S. Provisional Patent Application No. 63/316,729, filed on Mar. 4, 2022, which is herein incorporated by reference in its entirety for all purposes.

BACKGROUND

Existing techniques used to determine a position of a device depend on specific network signaling and processing. Relying on the network to complete these positioning operations may compromise availability and efficiency of the services from the perspective of the user.

DETAILED DESCRIPTION

Figure 1:
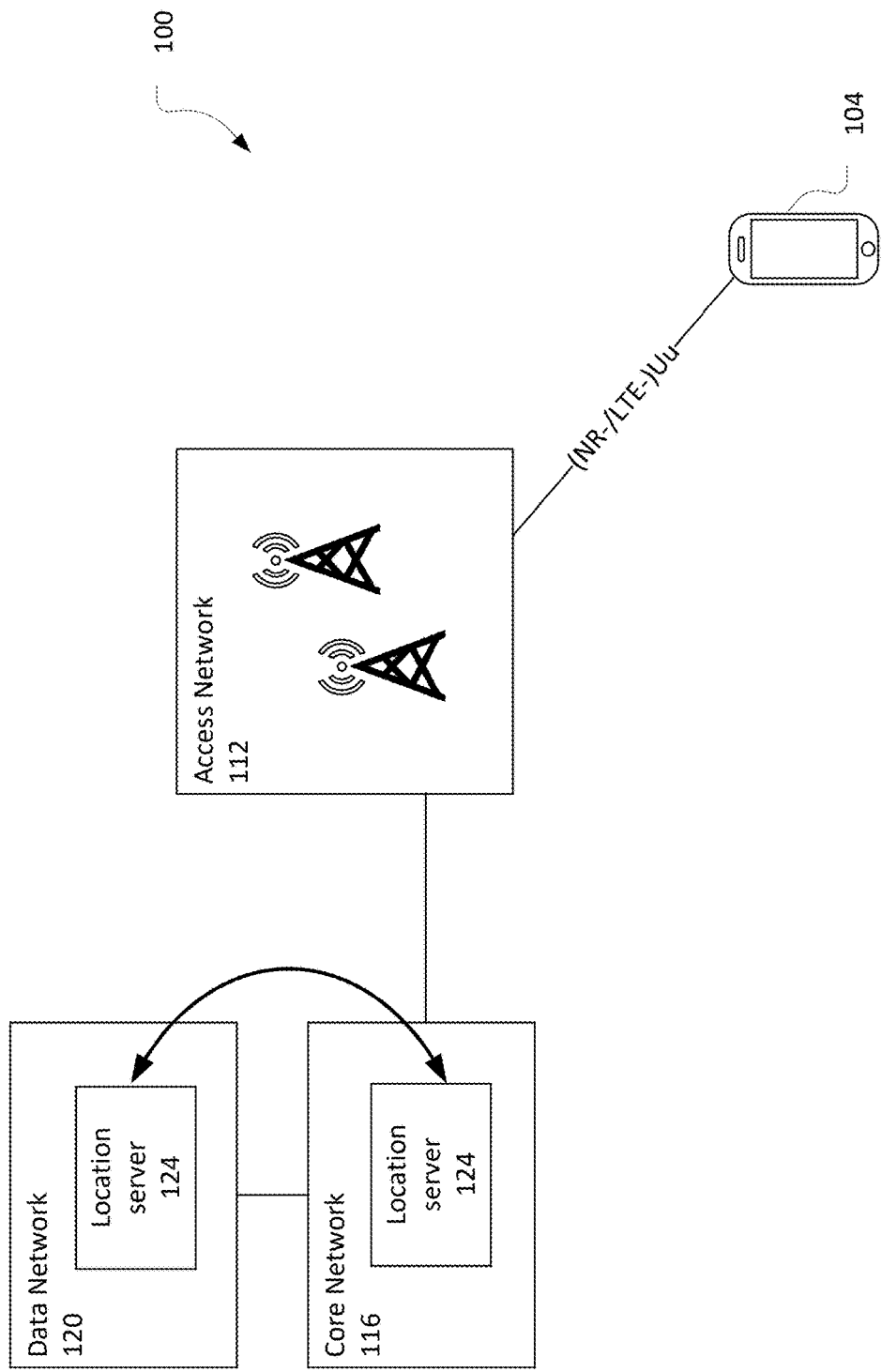
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 coupled with one or more access nodes of an access network 112. The UE 104 may communicate with the access network 112 over air interfaces compatible with 3GPP TSs such as those that define Long Term Evolution (LTE), Fifth Generation System (5GS) NR, or later standards. The access nodes of the access network 112 may include various types of base stations. For example, the access network 112 may include an evolved node B (eNB) that provides one or more LTE cells and is coupled with a evolved packet core (EPC), a next generation node B (gNB) that provides one or more NR cells and is coupled with a 5G core network (5GC), a next generation evolved node B (ng-eNB) that provides one or more LTE cells and is coupled with a 5GC, or another type of base station.

The UE 104 may communicate with an NR cell of the access network 112 via an NR-Uu interface and may communicate with an LTE cell of the access network 112 via an LTE-Uu interface.

The access network 112 may be coupled with a core network 116 via a backhaul connection. The core network 116 may include network elements that offer various data and telecommunications services to customers/subscribers (for example, a user of UE 104) who are connected to the core network 116 via the access network 112. The components of the core network 112 may be implemented in one physical node or separate physical nodes. In some embodiments, the core network 116 may be 5GC or an EPC.

The core network 116 may be coupled with a data network 120 that provides various network operator services, Internet access, or third party services.

A location server 124, which may be referred to as a location management function (LMF) in some instances, may provide location services to the UE 104. The location server 124 may reside in the core network 116 or the data network 120. The location server 124 may transfer assistance data to the UE 104 to assist with cellular positioning operations. The assistance data may be tailored to the type of positioning operation that is to be performed. In general, the assistance data may include information about access nodes in the vicinity of the UE 104, measurements taken with respect to the access nodes (and associated geographical coordinate information), or reference signal parameters corresponding to reference signals transmitted by the access nodes, which form a basis for the positioning measurements. The reference signal parameters may include, for example, bandwidth, frequency, periodicity, etc. As described herein, the assistance data may include access network measurements associated with UE locations in which the measurements were performed. Assistance data of this type may be referred to as measurement-location data.

In various embodiments, the UE 104 may perform access network measurements on signals from the access network 112 to support UE-based autonomous device positioning. Additional/alternative embodiments describe the UE 104 estimating cell tower locations and clock biases. These positioning operations may (or may not) rely on assistance data received from the network.

To perform UE-based autonomous device positioning, the UE 104 may measure signals from the access network 112 to determine various metrics that will allow the UE 104 to determine its position relative to one or more base stations. The metrics include, for example, reference signal received power (RSRP), angle of arrival (AOA), timing advance (TA), and reference signal time difference (RSTD).

UE-based cellular positioning may be desirable in situations in which there is limited wireless local area network (WLAN) or satellite navigation connectivity (for example, when the UE 104 is in a subway or parking garage). Further, UE-based cellular positioning may be used to complement existing location services to reduce latency or increase accuracy. For example, UE-based cellular positioning may be used to improve location accuracy of satellite-based systems by removing multi-pass outliers in downtown settings; reduce latency of acquiring location information when the UE 104 re-boots after a significant change in locations (for example, after a flight); or increase performance of WLAN/satellite location services in the presence of poor weather conditions.

Improving positioning performance may increase user experience and facilitate provision of time-sensitive services. For example, improving positioning performance may reduce the time required to route emergency service calls to the proper public-safety answering point (PSAP). This may, in turn, reduce the time for the PSAP response.

UE-based cellular positioning techniques may alleviate privacy concerns associated with providing coordinates of the UE 104 to the network. Further, relying on network resources using existing 3GPP techniques such as observed time difference of arrival (OTDOA) require configuring/transmitting positioning reference signals (PRSs), which may occupy network resources and impact cell capacity. Given that different networks may have different deployments, including many that do not provide PRSs, relying on network cooperation in this manner may result in an inconsistent user experience.

Embodiments describe UE-based autonomous device positioning that does not require feedback from the network. Various embodiments describe the UE 104 determining location (for example, coordinate) and timing (for example, synchronization) information corresponding to one or more base stations. The timing information may allow the UE 104 to virtually synchronize with asynchronous networks or discovery bias information in synchronized networks. Some of the UE-based positioning techniques described herein leverage existing and already available enhanced cell identity (E-CID) measurements. Embodiments describe use of TA-based distance estimation, which may be used without providing extra requirements for the network.

Figure 2:
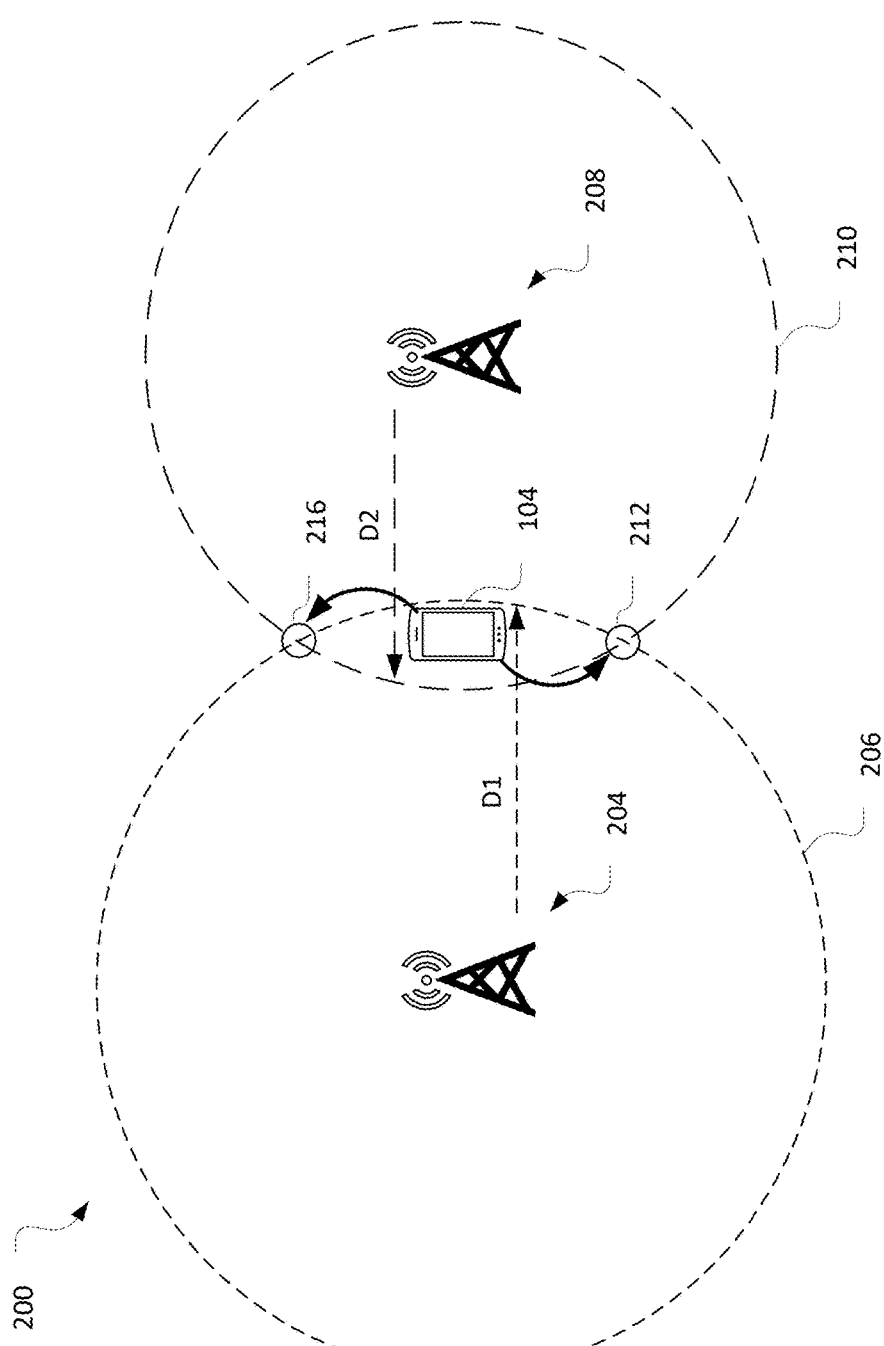
FIG. 2 illustrates a network environment in which a user equipment (UE) may perform a UE-based autonomous device positioning in accordance with some embodiments.

FIG. 2 illustrates a network environment 200 in which the UE 104 performs a UE-based autonomous device positioning in accordance with some embodiments. The network environment 200 may include the UE 104 and base stations 204 and 208.

The base stations 204 and 208 may be geographically separated from one another. The base stations 204 and 208 may be designed to be accessed independently from one another, for example, each base station 204 and 208 may be a standalone base station that provides an LTE or NR cell. Alternatively, the base stations 204 and 208 may include a non-standalone (NSA) base station that uses multi-radio access technology (RAT) dual connectivity (DC) to provide access in conjunction with an LTE cell. For example, one of the base stations 204 or 208 may be an eNB that provides an LTE cell as a primary serving cell (PCell), while the other base station 208 or 204 may be a gNB that provides an NR cell as a secondary serving cell (SCell). This may be referred to as an EUTRAN-NR dual connectivity (ENDC) system. The LTE PCell may be the anchor cell that provides some or all of the control signaling through signaling radio bearers (SRBs), while the NR SCell provides one or more data radio bearers (DRBs) to increase throughput capability of the system. In other embodiments, the base stations 204 and 208 may provide other DC scenarios including, for example, NR-NR DC (or simply "NR DC") in which both PCell and SCell are NR cells, or NR-EUTRAN DC (NEDC) in which the PCell is the NR cell and the SCell is an LTE cell.

In some embodiments, the UE 104 may have a multiple-subscriber identity module (MSIM) that allows the UE 104 to determine TA measurements for base stations that are provided by different carriers.

The UE 104 may use multilateration to determine a position of the UE 104. The multilateration may be based on location information (for example, geographical coordinates) of the base stations 204 and 208, and distances D1 and D2 to the base stations 204 and 208, respectively. The base station location information may be determined from previous UE or cell-tower localization operations such as those described herein. The distances may be determined based on respective TA measurements.

The UE 104 may determine a TA measurement (TA_204) associated with base station 204 to determine an approximate distance (D1) to the base station 204. Determining D1, and knowing the location of base station 204, will allow the UE 104 to determine its own location is somewhere along circle 206. Determining D2, and knowing the location of base station 208, will allow the UE 104 to determine its own location is somewhere along circle 210. Having knowledge of distances and base station locations with respect to both base station 204 and 208 will allow the UE 104 to determine its location is at an overlap of circles 206 and 210. In particular, the UE 104 may determine it is either at location 212 or location 216. In some instances, the circles 206 and 210 may overlap at one unique location.

The UE 104 may obtain the TA measurements by performing at least part of a random access channel (RACH) procedure. For example, the UE 104 may send a random access preamble to base station 204. This may be referred to as MSG1. The base station 204 may respond with a random access response, referred to as MSG2. The random access response may include a TA command. The TA command may be a set of 12 bits used provide a TA measurement (TA) within a range from 0 to 3846. The TA measurement may then be used to determine $N_{TA}$, which may be a timing offset between uplink and downlink radio frames at the UE 104, based on Equation 1 as follows:

$$N_{TA} = T_A * 16 * \frac{64}{2^\mu}, \qquad \text{Equation 1}$$

where μ is a subcarrier index spacing (0, 1, 2, or 3 for 15, 30, 60, or 120 KHZ, respectively). A round trip propagation delay between the UE 104 and the base station 204 may be determined by $N_{TA}*T_c$, where $T_c$ is a basic time unit that is 1/(480,000*4,096) seconds. Thus, the distance (D1) may be determined based on Equation 2 as follows:

$$D1 = \frac{N_{TA} * T_c}{2} * c, \qquad \text{Equation 2}$$

wherein c is the speed of light.

The UE 104 may determine the TA measurement for base station 208 and D2 in a similar manner.

Existing E-CID requires the UE to be connected with a serving base station and have knowledge of the location of the serving base station (also referred to as cell of origin (COO)). In contrast, the present embodiment does not require an active network connection. As shown above, a baseband of the UE 104 simply needs to trigger MSG1 and receive MSG2 of the RACH procedure. After receiving $N_{TA}$ in MSG2 from respective base stations, the UE 104 does not need to complete the RACH procedure with either base station. This may save power of the UE 104 and resources of the network.

In some embodiments, the UE 104 may be connected with one or more of the base stations involved in the multilateration process. If the UE is connected with a base station, it may use the most recent TA measurement. That may either be the TA measurement received in MSG2 or it could be received in a media access control (MAC) control element (CE).

The multilateration operation based on two base stations may provide one location of the UE 104, if the circles only overlap at one point, or two possible locations of the UE 104 as shown in FIG. 2 (assuming at least a partial overlap of coverage). In some embodiments, one or more additional base stations may be used to increase the precision/accuracy of the UE-based positioning operation.

Figure 3:
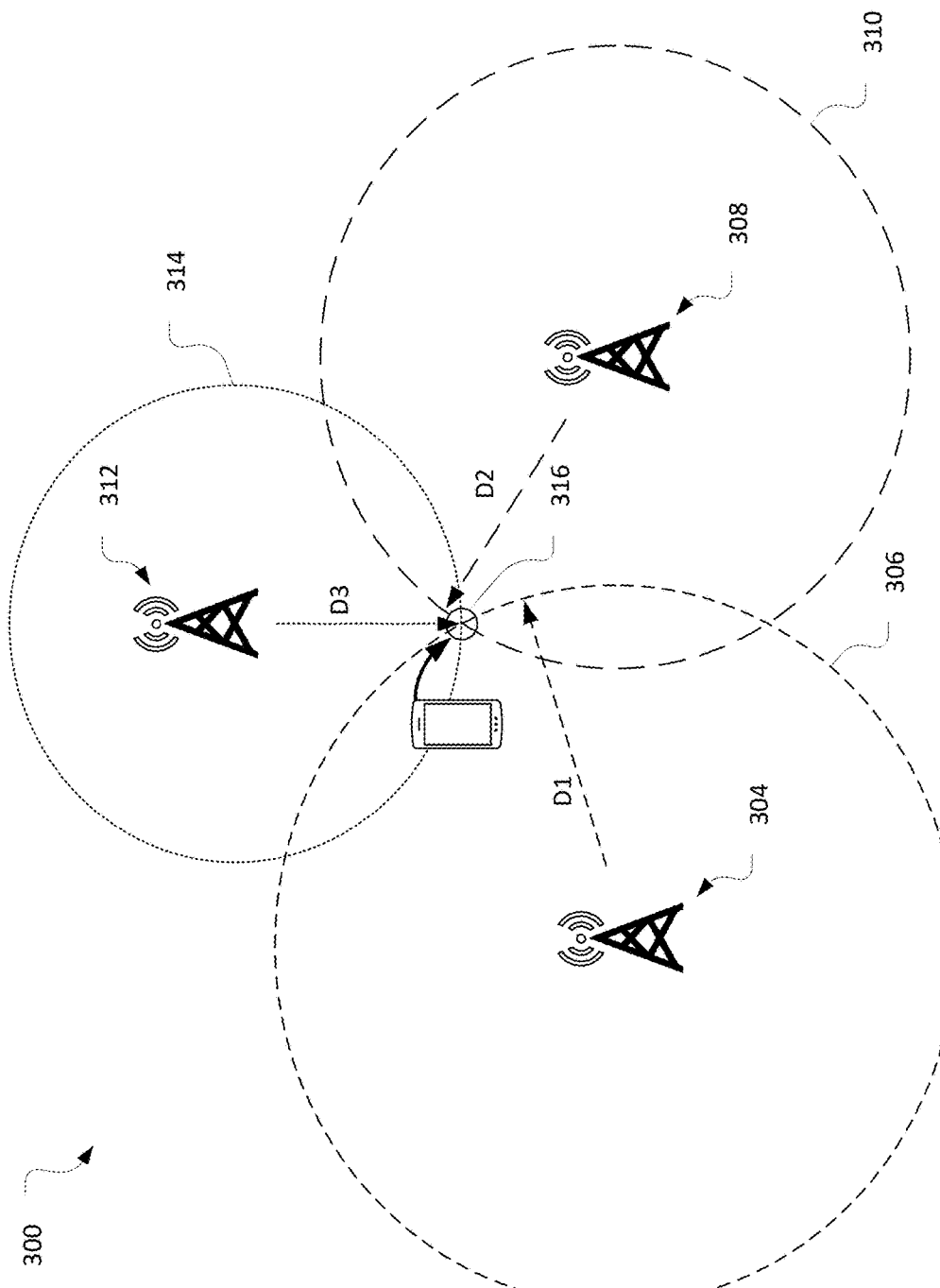
FIG. 3 illustrates another network environment in which a UE performs a UE-based autonomous device positioning in accordance with some embodiments.

FIG. 3 illustrates a network environment 300 in which the UE 104 performs a UE-based autonomous device positioning in accordance with some embodiments. The network environment 300 may include the UE 104 and base stations 304, 308, and 312.

In a manner similar to that described above, the UE 104 may determine a TA measurement from base station 304 to determine a distance D1 corresponding to circle 306, determine a TA measurement from base station 308 to determine a distance D2 corresponding to circle 310, and determine a TA measurement from base station 312 to determine a distance D3 corresponding to circle 314. Using a multilateration procedure with D1-D3, along with geographical coordinates from the respective base stations, the UE 104 may determine that it is positioned at location 316, which represents an overlap of circles 306, 310, and 312.

In some embodiments, the UE 104 may include an MSIM to determine concurrent TA measurements from base stations of different carriers. For example, the UE 104 may use a first subscriber identity module (SIM) to determine the TA measurement from base station 308, which may be an eNB of a first carrier, and base station 312, which may be a gNB of the first carrier; and may use a second SIM to determine the TA measurement from base station 312, which may be a gNB (or eNB) of a second carrier.

The TA measurements that support the UE-based positioning operation may be concurrent TA measurements. Providing this level of concurrency may improve accuracy of the multilateration process by ensuring the distances (for example, D1-D3) used with one another are not stale. Concurrency of TA measurements may be related to a mobility characteristic of the UE 104, for example, whether the UE 104 is in a stationary scenario or a moving scenario. The UE 104 may determine whether it is in the stationary or moving scenario based on one or more on-board sensors, for example, a motion/accelerometer sensor.

If the UE 104 is in the stationary scenario, for example, the UE 104 is not moving, the TA measurements from different cells obtained within a stationary period may be considered concurrent and used for multilateration. The UE 104 may use a last-available TA measurement from a connected state for multilateration if the connected state overlaps, in time, with the stationary period.

If the UE 104 is in a moving scenario, the UE 104 may trigger concurrent RACH procedures with multiple cells (e.g., LTE and NR or using different SIMs) to obtain concurrent TA measurements. A time window may be defined such that all TA measurements obtained within the time window may be considered concurrent. A size of the time window may be based on a speed that the UE 104 is traveling.

In some instances, the stationary period may correspond to the time window. Thus, if the UE 104 determines the mobility characteristic indicates it is in the stationary scenario, it may set the time window to the stationary period for purposes of concurrency determination.

If the UE 104 is an MSIM device, it may have one transmitter shared between the two SIMS or it may have a transmitter for each SIM, which may be referred to as a dual SIM, dual active (DSDA) device. If the UE 104 shares a transmitter between the two SIMs, RACH activity of the second SIM may impact performance of the primary SIM. Thus, embodiments provide for opportunistically tuning the transmitter for RACH activity of the secondary SIM to reduce impact to the primary SIM.

To reduce impact to the primary SIM, the UE 104 may identify non-transmitting periods of the primary SIM within which the transmitter may be used by the secondary SIM to obtain TA measurements. If the primary SIM uses a time-division duplexing (TDD) mode, these non-transmitting periods may include downlink subframes.

The non-transmitting periods may additionally/alternatively include subframes in which the primary SIM does not have an uplink grant.

If the UE 104 is a DSDA device, the RACH activity of the secondary SIM will not impact the performance of the primary SIM. Thus, obtaining the TA measurement by the secondary SIM may not be restricted.

In some embodiments, to obtain one or more additional TA measurements, the secondary SIM may trigger a RACH procedure with any carrier network other than the carrier provisioned for the primary SIM. Furthermore, the secondary SIM may trigger a RACH procedure with one or more neighbor cells. In some instances, the UE 104 may obtain one or more additional TA measurements by triggering RACH procedures with one or more cells without provisioning (for example, no SIM is programmed or inserted).

If the UE 104 obtains TA/distance information from two base stations of known locations, it may determine its location with a first degree of accuracy. This accuracy may be increased if the UE 104 can obtain TA/distance information from one or more additional base stations of known locations. In some embodiments, the UE 104 may increase its positioning accuracy by estimating an angle of arrival (AoA) of signals from one or more base stations of known locations. This may be used in conjunction with the TA/distance information.

Figure 4:
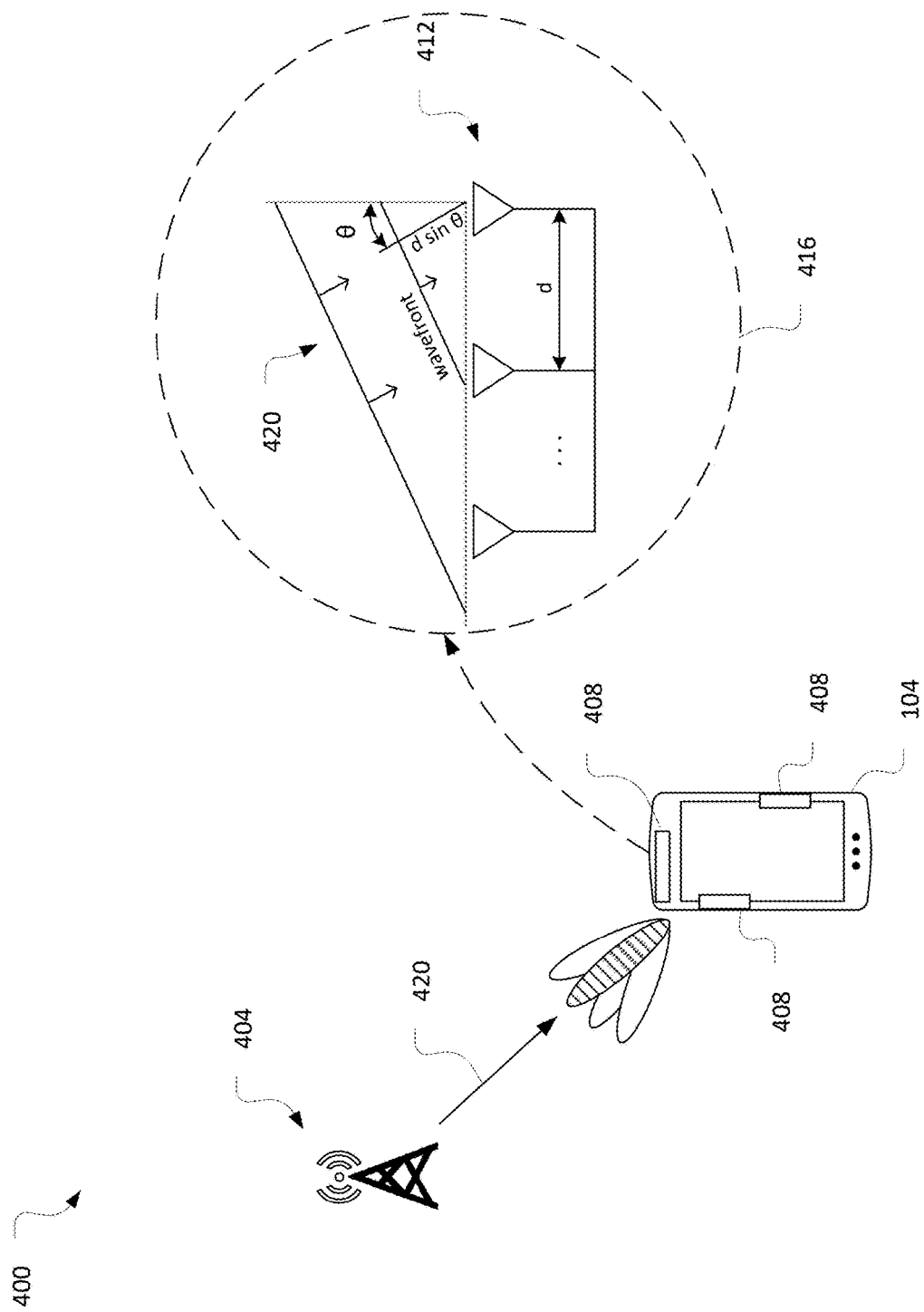
FIG. 4 illustrates another network environment in which a UE performs a UE-based autonomous device positioning in accordance with some embodiments.

FIG. 4 illustrates a network environment 400 in accordance with some embodiments. The network environment 400 may include the UE 104 and base station 404. The UE 104 may include one or more antenna arrays 408 with each antenna array having a number of antenna elements 412. The UE 104 shown with three antenna arrays 408; however, other embodiments may include other numbers of antenna arrays. The antenna elements 412 are shown in callout 424 with a normalized distance (d) between adjacent elements.

The UE 104 may estimate an AoA of a signal 420 from the base station 404.

The signal may be a channel state information-reference signal (CSI-RS), a synchronization signal block (SSB) signal, or other periodic signal. The signal 420 will arrive at the UE 104 from an AoA ($\theta$) relative to a reference direction. The UE 104 may determine the AoA based on delay at which adjacent antenna elements, separated by d, receive the wavefront of the signal. The delay (t) may be given by Equation 3 as follows:

$$\tau = \frac{d\sin\theta}{c}. \qquad \text{Equation 3}$$

As shown in the callout 416, when the wavefront is received at the middle antenna element, it is still a distance d*sin θ from the antenna element on the right. The time that the signal takes to traverse that distance may correspond to the delay.

The reference direction for determining AoA may be a global reference direction (for example, north) with respect to a geographical coordinate system. It may be noted that the UE 104 may first determine the AoA with respect to a local reference direction based on positions of the antenna elements 412. The local reference direction may change with orientation of the UE 104. The UE 104 may use on-board sensors (for example, 3-axis gyro sensors) to determine its orientation and use that information to transform the local reference direction into the global reference direction.

Figure 5:
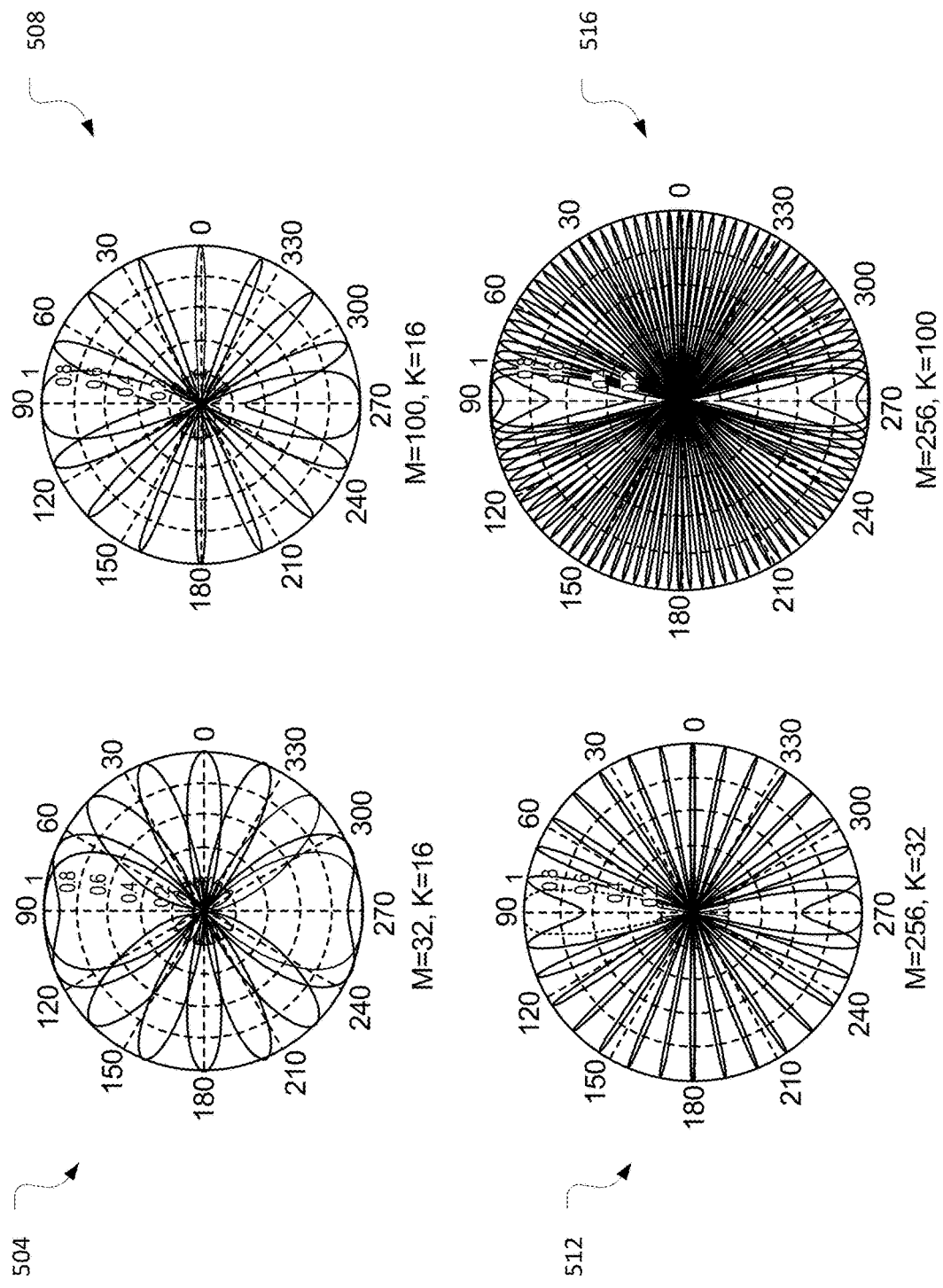
FIG. 5 illustrates receive beamforming deployments in accordance with some embodiments.

In some embodiments, the UE 104 may perform the AoA estimation using receive (Rx) beam sweeping, which may be based on a UE Rx antenna codebook. The UE Rx antenna codebook may include a plurality of sets of beamforming weights that tune receive components of the UE 104 to match different delays. Thus, each set of beamforming weights may correspond to a receive beam that receives signals from one direction better than others. A width and gain of a receive beam depends on a number of antenna elements and a number of beams created by those antenna elements as provided by the UE Rx antenna codebook. FIG. 5 illustrates example deployments in accordance with some embodiments. In deployment 504, the UE 104 may have 32 antenna elements and 16 receive beams. In deployment 508, the UE 104 may have 100 antenna elements and 16 receive beams. In deployment 504, the UE 104 may have 256 antenna elements and have 32 receive beams. In deployment 504, the UE 104 may have 256 antenna elements and have 100 receive beams The UE 104 may receive the signal 420 (or sequential instances of the signal 420) by a plurality of receive beams and determine which receive beam is associated with the highest signal quality (for example, the receive beam shown with cross-hatching in FIG. 4). In this manner, the UE 104 may determine the AoA of the signal 420 and, resultantly, the direction of the base station 404. This direction information may be used with distance information (obtained from TA measurement as described above) to know the relative location of the UE 104 with respect to the base station 404. If the UE 104 also knows the location of the base station 404, it may determine its own location accordingly.

The UE 104 may determine AoA in frequency range 1 (FR1) between 450 MHz and 7,250 MHz, frequency range 2 (FR2) between 24,250 MHz and 52,600 MHz, and higher frequencies. Given that smaller antenna elements are needed to receive the higher-frequency signals, operation within FR2 and above may enable the UE 104 to use a larger UE Rx antenna codebook. This may provide a larger number of receive beams, which may increase the granularity of the AoA estimate. This may be the case even with the limited form factor typically associated with the UE 104.

In some embodiments, inaccuracies associated with either determining distance from TA measurements or direction from AoA estimation may be addressed by increasing the number of data points contributing to the analysis. This may be performed by populating a database with previous measurements performed by the UE 104 and, perhaps, other UEs as well.

Figure 6:
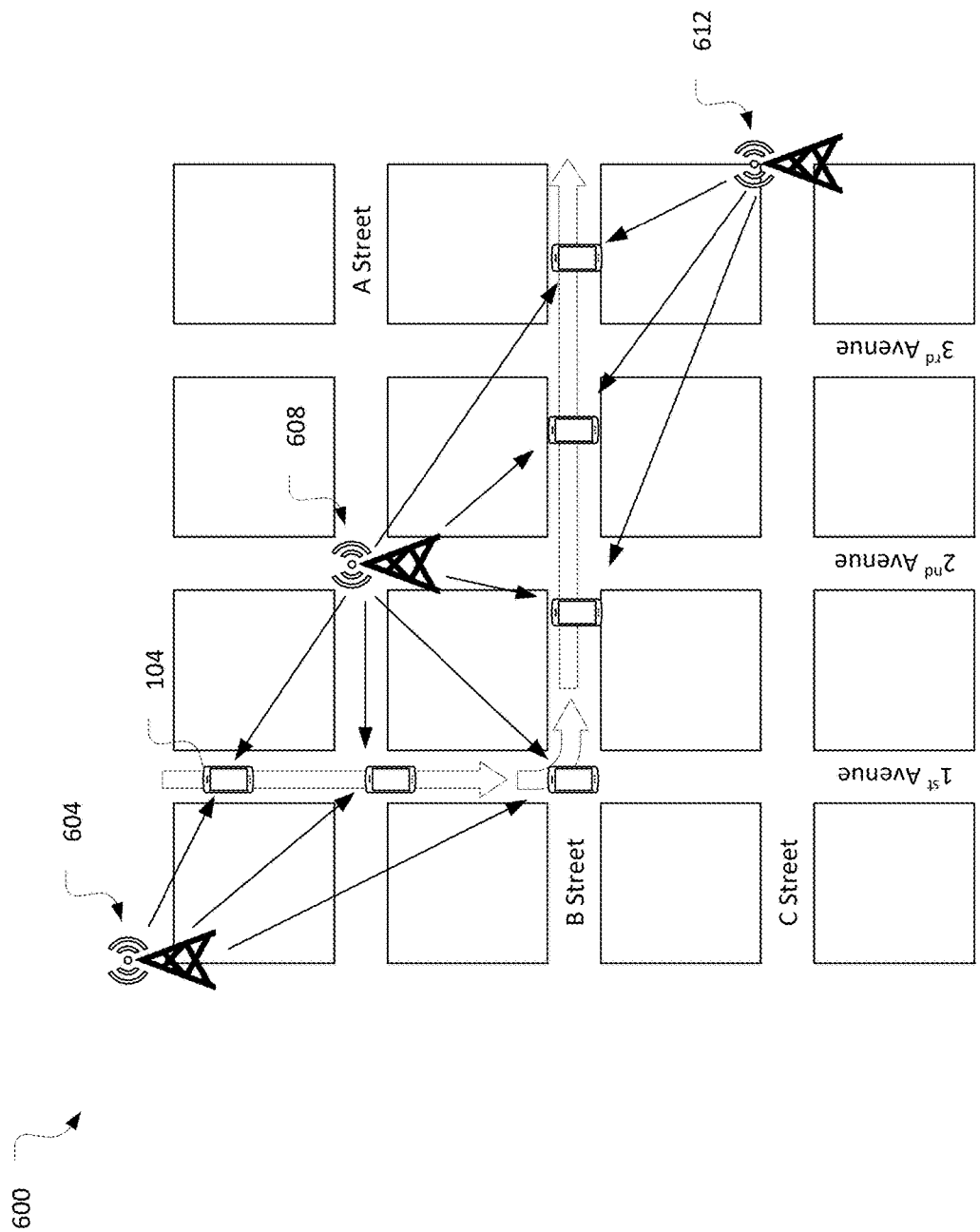
FIG. 6 illustrates a network environment to illustrate measurement-location data harvesting in accordance with some embodiments.

FIG. 6 illustrates a network environment 600 to describe measurement-location data harvesting in accordance with some embodiments. The network environment 600 may include base stations 604, 608, and 612 statically deployed in various locations in a neighborhood. The network environment 600 also shows UE 104 at different locations.

As the UE 104 travels through the neighborhood, for example, south on $1^{st}$ Avenue and then east on B Street, it may harvest measurements from the base stations 604, 608, and 612. The measurements may be TA measurements, AoA measurements, or signal-strength measurements (for example, received signal code power (RSCP), reference signal received power (RSRP), reference signal received quality (RSRQ), received signal strength indicator (RSSI), or signal to noise ratio (SNR)).

The UE 104 may associate the collected measurements with a location of the UE 104 at the time the measurements were harvested. The location of the UE 104 may be determined by techniques describe herein (for example, UE-based multilateration or UE-based AoA estimates) or by other positioning techniques (for example, using WLAN/satellite location services). The collected set of measurements and associated locations, which may be referred to as measurement-location data, may be stored in a data structure within memory at the UE 104.

At a later time, the UE 104 may access the data structure to determine a location based on measurements taken at that later time. For example, the UE 104 may perform a measurements and access the data structure to identify previously performed measurements that most closely matches the most recent measurements. The UE 104 may then determine that the location associated with the previously-performed measurements is its current location. The UE 104 may do this without relying on any location services (either network-based or UE-based) at that later time.

While FIG. 6 describes the UE 104 populating the data structure with measurement-location data generated by the UE 104, additional/alternative embodiments may include accessing a data structure that includes measurement-location data generated by one or more other UEs. For example, the location server 124 may collect measurement-location data associated with a particular area from one or more other UEs. The location server 124 may then aggregate the data from a plurality of UEs and store the aggregated measurement-location data for the area as a discrete data structure, which may be referred to as a tile. The UE 104 may, at a later time, send the location server 124 a request for measurement-location data for the area, and the location server 124 may provide the UE 104 with the requested tile.

The measurement-location data may be collected and distributed in a source-agnostic manner to alleviate any privacy concerns. For example, the location server 124 may receive the measurement-location data from a UE as anonymous feedback. That is, the measurement-location data may be provided to the location server 124 without any information that may be used to identify the source of the data. The source of the information may be anonymized by using generic user/device identities and randomizing collection timestamps and reporting intervals. Further, when the location server 124 provides, to a requesting UE, measurement-location data for an area, only the measurements and associated locations are provided in the data structure. Thus, no information that may be used to identify a source of the measurement-location data is to be collected or distributed.

Various of the described UE-based device positioning operations are facilitated by the UE 104 knowing the location of the base stations that provide basis of positioning measurements. In some embodiments, known geographical coordinates of one or more UEs may be used to reversely compute geographical coordinates of a base station using TA measurements or RSTD.

Figure 7:
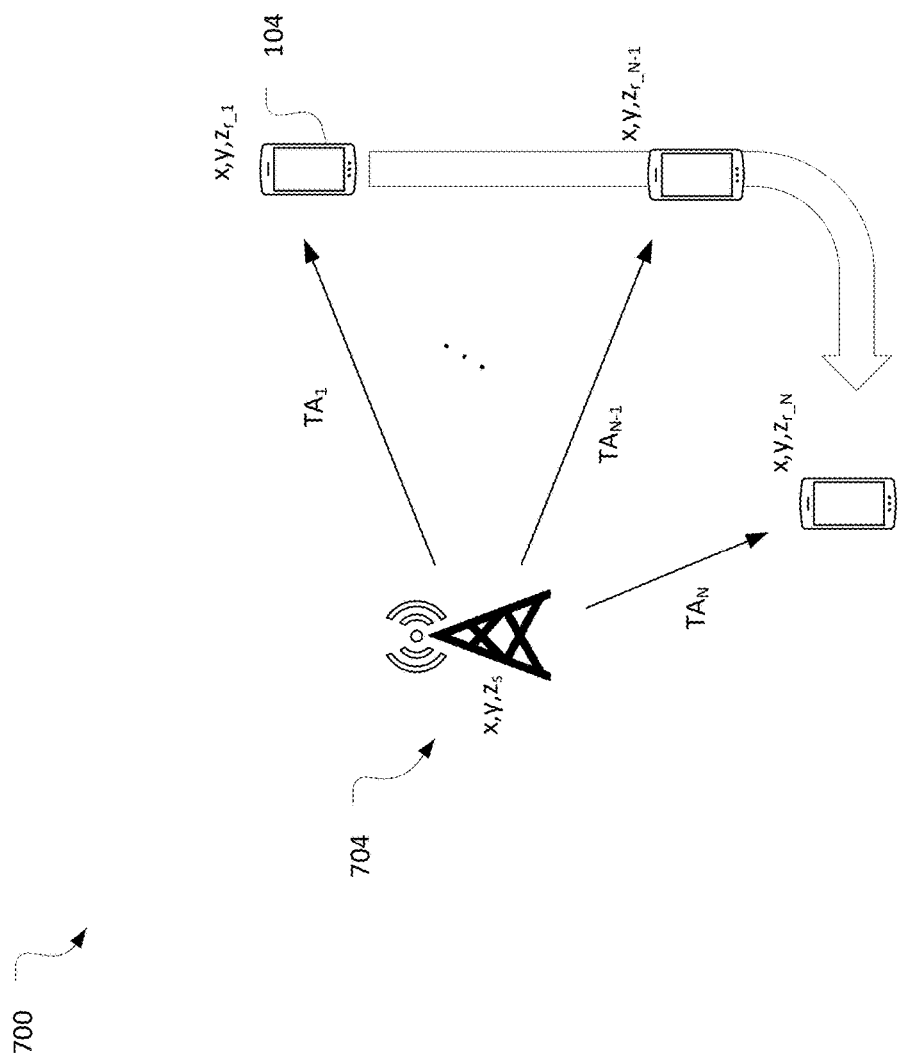
FIG. 7 illustrates a network environment in which a UE performs cell-tower localization in accordance with some embodiments.

FIG. 7 illustrates a network environment 700 in which the UE 104 may perform a cell-tower localization using TAs and known UE coordinates in accordance with some embodiments. The network environment 700 may include base station 704 and UE 104.

The network environment 700 shows the UE 104 at a plurality of locations (for example, N locations) that may result from movement of the UE 104. The UE 104 may know the coordinates of each location. This location information may be determined by techniques describe herein (for example, UE-based multilateration or UE-based AoA estimates) or by other positioning techniques (for example, using WLAN/satellite location services).

The known parameters, for example, the UE coordinates, may be defined by Equation 4 as:

$$x, y, z_{r_n} = \begin{bmatrix} x_{r_n} \\ y_{r_n} \\ z_{r_n} \end{bmatrix} \quad \text{Equation 4}$$

and the unknown parameters, for example, the base station coordinates, may be defined by Equation 5 as:

$$x, y, z_s = \begin{bmatrix} x_s \\ y_s \\ z_s \end{bmatrix} \quad \text{Equation 5}$$

The UE 104 may determine a TA at each of the N locations. The TA may include a component corresponding to a distance that is equal to twice the distance from the UE to the base station ($d_n$) and a noise component ($v_n$). The NTAs may be converted to N distance estimates in a manner similar to that described above.

Using the known UE location coordinates and the N distance estimates, the UE 104 may compute the base station coordinates. In some embodiments, the UE 104 may estimate the base station coordinates, x,y,$z_s$, using a weighted nonlinear least squares (WNLS) technique, an extended Kalman filter (EKF) technique, or some other multilateration technique. WNLS/EKF may be used for a best estimate of location of the base station even in the presence of noise.

While FIG. 7 describes the UE 104 using TA information acquired from a plurality of locations by the UE 104, embodiments may additionally/alternatively use TA information acquired from a plurality of locations by other UEs. This may be enabled by UEs sharing TA-location data with respect to base station 704 with the location server 124. Collection and distribution of this data may be anonymized in a manner similar to that described above.

Figure 8:
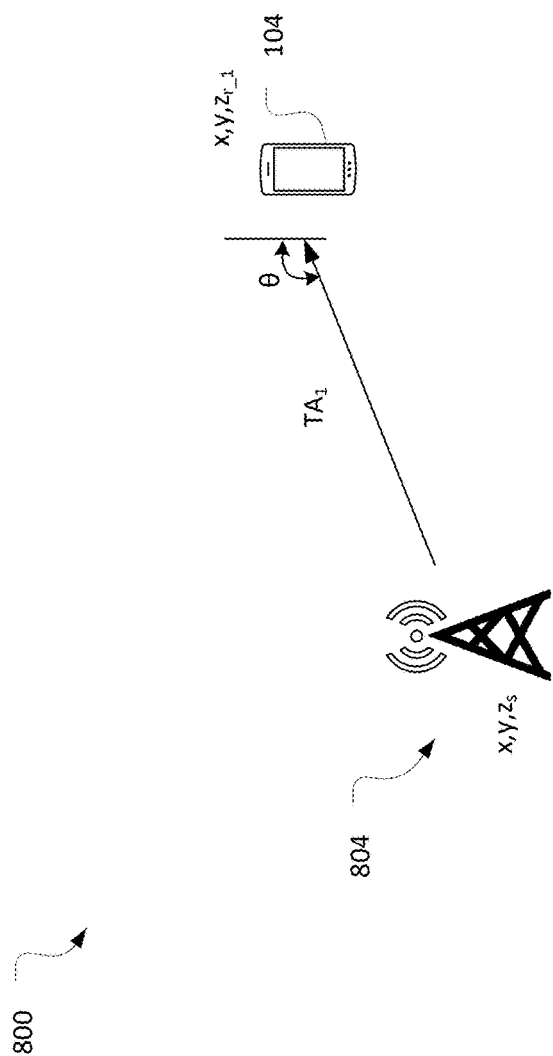
FIG. 8 illustrates another network environment in which a UE performs cell-tower localization in accordance with some embodiments

FIG. 8 illustrates a network environment 800 in which the UE 104 may perform a cell-tower localization using TA, AoA information, and known UE coordinates in accordance with some embodiments. The network environment 800 may include base station 804 and UE 104.

Similar to that described above with respect to FIG. 6, the UE 104 may obtain a TA measurement ($TA_1$) at a known UE location, x,y,$z_{r\_1}$. However, instead of relying on a multilateration technique that uses a plurality of TA measurements at a corresponding plurality of locations, the UE 104 may also determine an AoA of a signal from the base station 804 while the UE 104 is at location, x,y,$z_{r\_1}$. The UE 104 may then estimate the location of the base station, x,y,$z_s$, using a distance to the base station (derived from $TA_1$) and relative direction of the base station 804 from the UE 104 (derived from the AoA).

In some embodiments, instead of relying on TA/AoA to determine a base station location as described above with respect to FIGS. 6 and 8, the UE 104 may use RSTD measurements. Relying on an RSTD measurement to determine base station locations may imply a certain level of time synchronization between the base stations that transmit the reference signals used to determine the RSTD measurement and the UE. Even though the UE/base stations may not be time-synchronized, the clock bias may be modeled into the math formula used to derive the locations.

Figure 9:
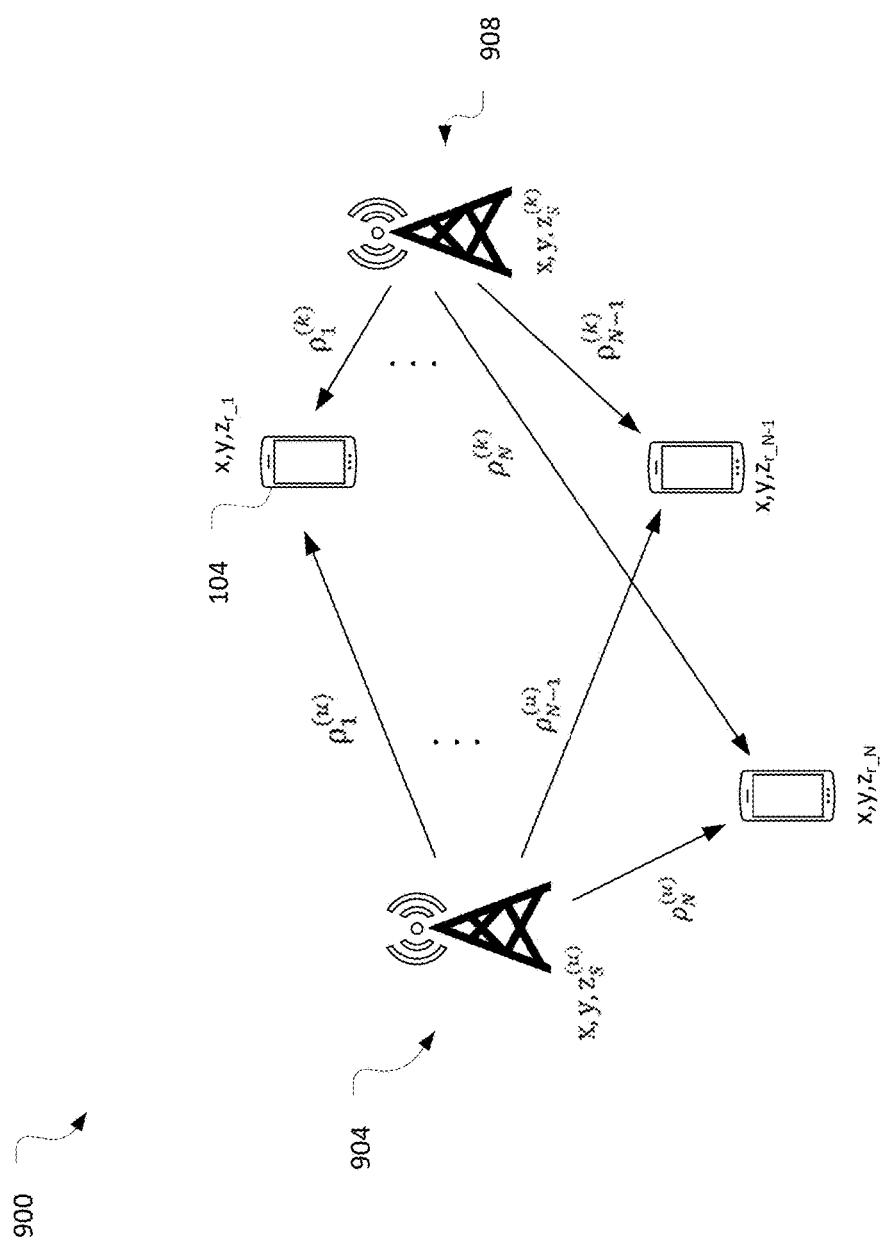
FIG. 9 illustrates another network environment in which a UE performs cell-tower localization in accordance with some embodiments

FIG. 9 illustrates a network environment 900 in which the UE 104 may perform a cell-tower localization with clock bias estimation using RSTDs and known UE coordinates in accordance with some embodiments. The network environment 600 may include base station 904 and UE 104.

The network environment 900 shows the UE 104 at a plurality of locations (for example, N locations) that may result from movement of the UE 104. The UE 104 may know the coordinates of each location. This location information may be determined by techniques describe herein (for example, UE-based multilateration or UE-based AoA estimates) or by other positioning techniques (for example, using WLAN/satellite location services).

The known parameters, for example, the UE coordinates, may be defined by Equation 4 as shown above and the set of unknown parameters, $r_S^{(u)}$, may include the coordinates of the base station 904, clock bias of the base stations 904, $\delta_S^{(u)}$, and clock bias of the UE 104, $\delta t_R$, as defined by Equation 6 as:

$$r_S^{(u)} = \begin{bmatrix} x_S^{(u)} \\ y_S^{(u)} \\ z_S^{(u)} \end{bmatrix}, \delta t_S^{(u)}, \delta t_r. \quad \text{Equation 6}$$

A pseudo-range measurement, $\rho_n^{(u)}$, that relates to a distance between the UE 104 and the base station 904 may be modeled by Equations 7 and 8 as:

$$\rho_n^{(u)} \triangleq c * \tau_{0_n}^{(u)} \quad \text{Equation 7}$$

$$= d_n^{(u)} + c(\delta t_S^{(u)} - \delta t_r) + v_n^{(u)} \quad \text{Equation 8}$$

where $\tau_{0_n}^{(n)}$ is the difference between the time a reference signal is sent from the base station 904 and the time the reference signal is received by the UE 104, $d_n^{(u)}$ is the distance between the base station 904 and the UE 104, and $v_n^{(u)}$ is the noise in the distance.

As shown in Equation 8, the pseudo-range measurement is dependent on the difference between clock bias of the base station 908 and the clock bias of the UE 104.

To get rid of the clock bias of the UE 104, embodiments differentiate UE measurements from multiple base stations by use of an RSTD that quantifies a subframe timing difference between a cell provided by the base station 904 and a cell provided by the base station 908. The RSTD may relate to a difference in a time of arrival of reference signals at the UE 104 from base station 904 and from the base station 908. The RSTD may be associated with a pseudo-range measurement, $\rho_n^{(uk)}$, that relates to a difference between pseudo-range measurement, $\rho_n^{(u)}$, and pseudo-range measurement, $\rho_n^{(u)}$, which relates to a distance between the UE 104 and the base station 908 and can be estimated in a manner similar to that described above with respect to base station 904. The pseudo-range measurement, may be modeled by Equations 9-11 as:

$$\rho_n^{(uk)} \triangleq \rho_n^{(u)} - \rho_n^{(k)} \qquad \text{Equation 9}$$

$$= c * \left( \tau_{0_n}^{(u)} - \tau_{0_n}^{(k)} \right) \qquad \text{Equation 10}$$

$$= d_n^{(uk)} + c\left(\delta t_S^{(uk)}\right) + v_n^{(uk)} \qquad \text{Equation 11}$$

$\tau_{0_n}^{(k)}$ is the difference between the time a reference signal is sent from the base station where 908 and the time the reference signal is received by the UE 104, $d_n^{(uk)}$ is a difference between the distance from the UE 104 to the base station 904 and the distance from the UE 104 to the base station 908, $v_n^{(uk)}$ is a difference between the measurement noise of the estimated time of arrival to the base station 904 and the estimated time of arrival to base station 908, and $\delta t_S^{(uk)}$ is a difference between a clock bias of the base station 904 and a clock bias of the base station 908.

Performing RSTD measurements at multiple locations may provide the UE 104 with sufficient data to perform a WNLS or EKF to estimate locations of the base stations 904 (x, y, $z_S^{(u)}$) and 908 (x, y, $z_S^{(k)}$) and to estimate the difference in the clock biases between the base stations 904 and 908 ($\delta t_S^{(uk)}$).

If the UE 104 wants to localize itself based on measurements that may be sensitive to different clock biases, the UE 104 may use estimates of the locations of the base stations in conjunction with the estimates of the difference in the clock biases to do so.

While FIG. 9 describes the UE 104 using RSTD information acquired from a plurality of locations by the UE 104, embodiments may additionally/alternatively use RSTD information acquired from a plurality of locations by other UEs. This may be enabled by UEs sharing location-RSTD data with respect to base stations 904 and 908 with the location server 124. Collection and distribution of this data may be anonymized in a manner similar to that described above.

In general, using the RSTD measurements to determine the locations of the base stations may benefit from more data samples to support more equations. Thus, the data set that forms the basis of the RSTD measurements to support UE localization may include a relatively large number of samples from different locations taken by one or more UEs.

The calculation of the location of the base stations based on known UE locations and TA, AoA, or RSTD measurements, as described above in FIGS. 7-9 may be performed by the UE 104 or by the location server 124. If the base station locations are calculated by the location server 124, they may be transmitted to the UE 104 to facilitate UE-based positioning techniques described herein.

Figure 10:
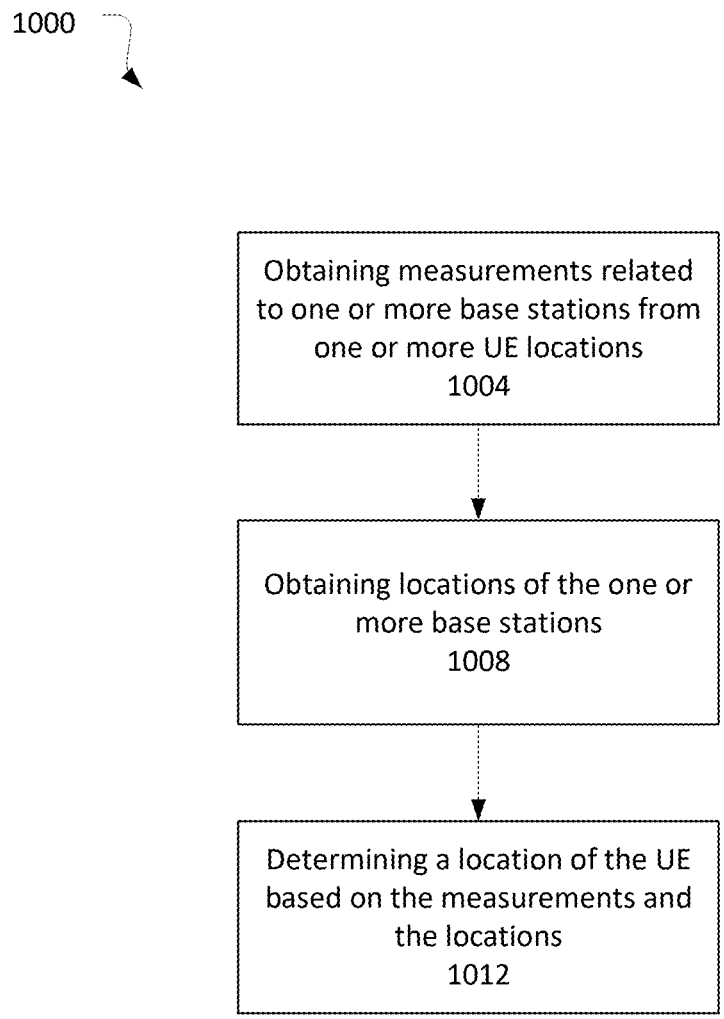
FIG. 10 illustrates another operational flow/algorithmic structure in accordance with some embodiments.

FIG. 10 illustrates an operation flow/algorithmic structure 1000 in accordance with some embodiments. The operation flow/algorithmic structure 1000 may be performed by a UE such as, for example, UE 104 or 1200, or components thereof, for example, processing circuitry 1204.

The operation flow/algorithmic structure 1000 may include, at 1004, obtaining measurements related to one or more base stations from one or more UE locations. The measurements may be performed on signals transmitted by the one or more base stations while a UE is in one of the UE locations. The measurements may be any combination of TA, AoA, signal strength (for example, RSRP, RSRQ, RSSI, or SNR), or RSTD measurements. The obtained measurements may have been performed by the UE implementing the operation flow/algorithmic structure 1000 or by one or more other UEs.

In some embodiments, the measurements may be one type of measurement that is taken at a plurality of different UE locations. For example, the measurements may include TA measurements taken at a plurality of UE locations. In other embodiments, the measurements may include a plurality of types of measurements take at one or more UE locations. For example, the measurements may include a TA measurement and an AoA measurement taken at one or more locations.

In some embodiments, the operation flow/algorithmic structure 1000 may be performed by a UE that is not actively connected with at least one of the one or more base stations that transmit signals that are used for the measurements obtained at 1004.

The operation flow/algorithmic structure 1000 may further include, at 1008, obtaining locations of the one or more base stations. The locations of the one or more base stations may have been predetermined by the UE implementing the operation flow/elder neck structure 1000, by one or more other UEs, or by a network node.

The operation flow/algorithmic structure 1000 may further include, at 1012, determining a location of the UE based on the measurements and the locations. The location may be determined using a multilateration technique or some other technique described herein.

Figure 11:
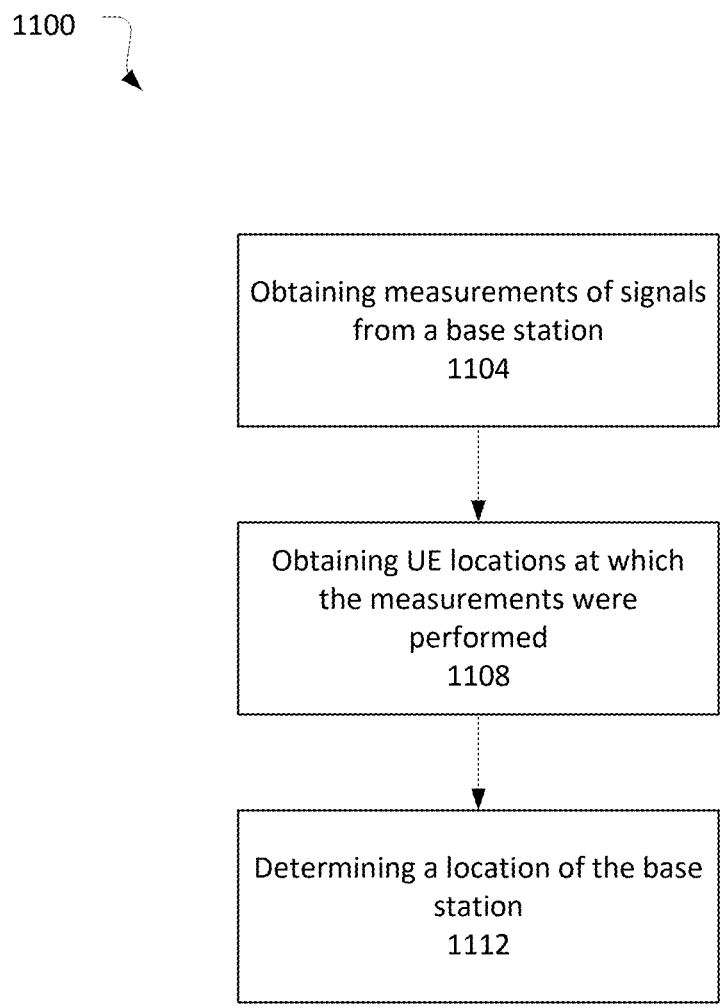
FIG. 11 illustrates another operational flow/algorithmic structure in accordance with some embodiments.

FIG. 11 illustrates an operation flow/algorithmic structure 1100 in accordance with some embodiments. The operation flow/algorithmic structure 1100 may be performed by a UE such as, for example, UE 104 or 1200, or components thereof, for example, processing circuitry 1204.

The operation flow/algorithmic structure 1100 may include, at 1104, obtaining measurements of signals from the base station. The measurements may be any combination of TA, AoA, signal strength (for example, RSRP, RSRQ, RSSI, or SNR), or RSTD measurements. The obtained measurements may have been performed by the UE implementing the operation flow/algorithmic structure 900 or by one or more other UEs.

In some embodiments, the measurements may be one type of measurement that is taken at a plurality of different UE locations. For example, TA measurements taken at a plurality of UE locations. In other embodiments, the measurements may include a plurality of types of measurements take at one or more UE locations. For example, the measurements may include a TA measurement and an AoA measurement taken at one or more locations.

The operation flow/algorithmic structure 1100 may further include, at 1108, obtaining UE locations in which the measurements were performed. In the event the measurements were taken by the UE performing the operation flow/algorithmic structure 1100, the UE locations may be obtained by UE-based multilateration, UE-based AoA estimates), or by another positioning technique (for example, using WLAN/satellite location services) performed by the UE (with or without assistance from a network). In the event the measurements were taken by other UEs, the UE may receive a report from the network that provides the measurements and an associated UE location at which the measurements were taken.

The operation flow/algorithmic structure 1100 may further include, at 1112, determining a location of the base station. The implementing UE may determine the location of the base station based on the measurements and the locations in which they were performed. In some embodiments, the implementing UE may use a WNLS technique, an EKF technique, a multilateration technique, or some other technique described herein.

Figure 12:
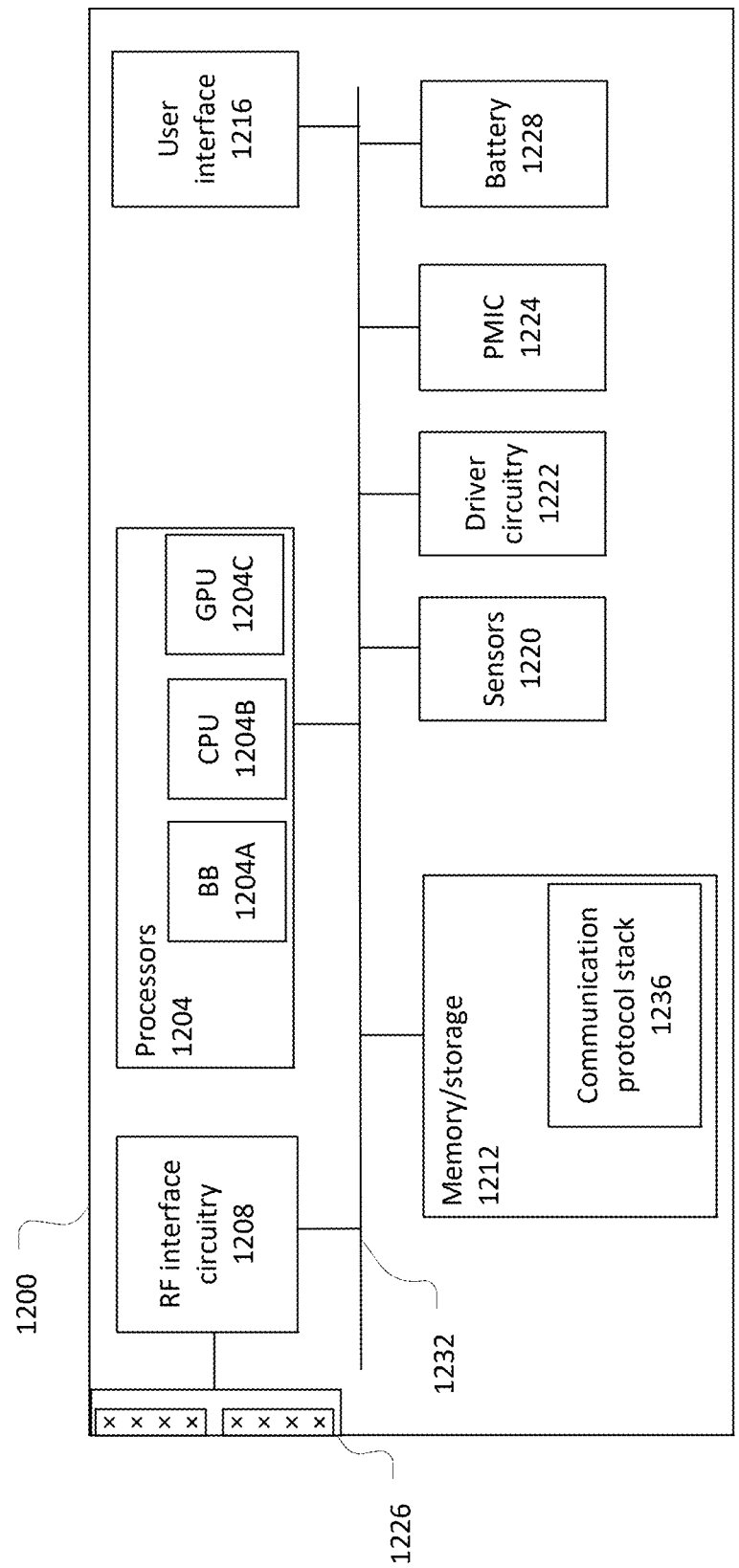
FIG. 12 illustrates a user equipment in accordance with some embodiments.

FIG. 12 illustrates a UE 1200 in accordance with some embodiments. The UE 1200 may be similar to and substantially interchangeable with UE 104 of FIG. 1.

The UE 1200 may be any mobile or non-mobile computing device, such as, for example, mobile phones, computers, tablets, XR devices, glasses, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, or optical connection that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack 1236 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, or phased array antennas. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various I/O devices that may be present within, or connected to, the UE 1200. For example, the driver circuitry 1212 may include circuitry to facilitate coupling of a UICC (for example, UICC 148) to the UE 1200. For additional examples, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200 including DRX as discussed herein.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
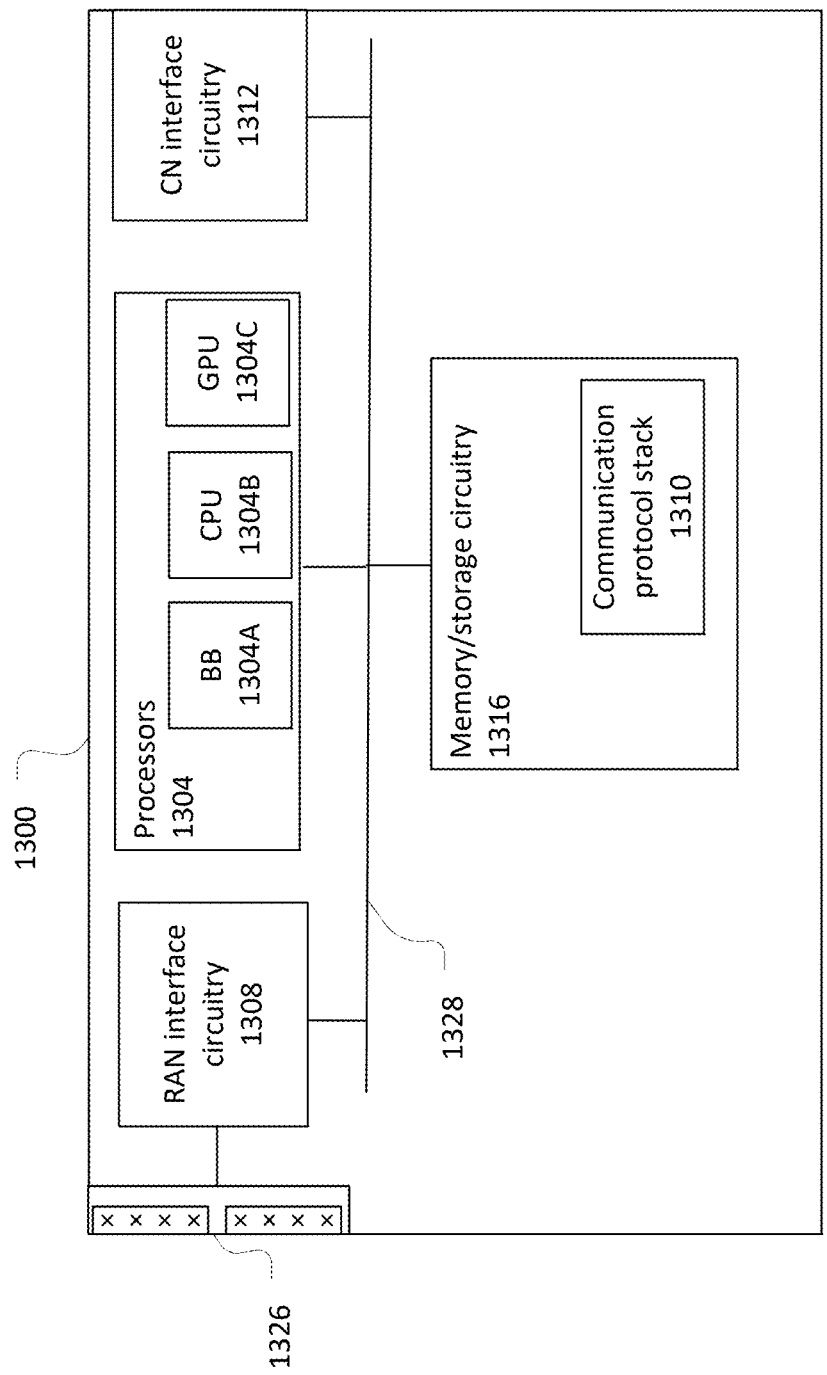
FIG. 13 illustrates a network node in accordance with some embodiments.

FIG. 13 illustrates a network node 1300 in accordance with some embodiments. The network node 1300 may be similar to and substantially interchangeable with any node of FIG. 1 including, for example, the location server 134.

The network node 1300 may include processors 1304, RF interface circuitry 1308 (if implemented as an access node), core network (CN) interface circuitry 1312, memory/storage circuitry 1316, and antenna structure 1326.

The components of the network node 1300 may be coupled with various other components over one or more interconnects 1328.

The processors 1304, RF interface circuitry 1308, memory/storage circuitry 1316 (including communication protocol stack 1310), antenna structure 1326, and interconnects 1328 may be similar to like-named elements shown and described with respect to FIG. 12.

The CN interface circuitry 1312 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the base station 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

In some embodiments, the network node 1300 may be coupled with transmit receive points (TRPs) using the antenna structure 1326, CN interface circuitry, or other interface circuitry.

As described herein, one aspect of the present technology is the gathering and use of data available from specific and legitimate sources to enable UE-based cellular positioning. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of measurement-location data during registration for services or anytime thereafter.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

Examples

In the following sections, further exemplary embodiments are provided.

Example 1 includes a method of operating a user equipment (UE), the method comprising: obtaining a first timing advance (TA) measurement with respect to a first base station that is at a first location; obtaining a second TA measurement with respect to a second base station that is at a second location; determining a location of the UE based on the first TA measurement, the second TA measurement, the first location, and the second location.

Example 2 includes a method of example 1 or some other example herein, wherein the first base station is an evolved node B (eNB) and the second base station is a next-generation node B (gNB).

Example 3 includes the method of example 1 or some other example herein, further comprising: obtaining the first TA measurement using a first subscriber identity module (SIM); and obtaining the second TA measurement using a second SIM.

Example 4 includes a method of example 1 or some other example herein, further comprising: obtaining a third measurement with respect to a third base station.

Example 5 includes the method of example 1 or some other example herein, further comprising: determining the first location of the first base station; and determining the second location of the second base station.

Example 6 includes the method of example 1 or some other example herein, further comprising: determining the first TA measurement is concurrent with the second TA measurement; and using the first TA measurement and the second TA measurement to determine the location of the UE based on said determining that the first TA measurement is concurrent with the second TA measurement.

Example 7 includes the method of example 6 or some other example herein, further comprising: determining the first TA measurement is concurrent with the second TA measurement based on said obtaining the first TA measurement and the second TA measurement within a time window.

Example 8 includes method of example 7 or some other example herein, further comprising: determining a mobility characteristic of the UE; and setting a size of the time window based on the mobility characteristic.

Example 9 includes the method of example 1 or some other example herein, wherein obtaining the first TA measurement comprises: triggering a random access channel (RACH) procedure with the first base station.

Example 10 includes the method of example 9 or some other example herein, further comprising: obtaining the first TA measurement using a first subscriber identity module (SIM); obtaining the second TA measurement using a second SIM; identifying a period of time in which the second SIM will not use a transmitter of the UE; triggering the RACH procedure within the period of time.

Example 11 includes a method of operating a user equipment (UE), the method comprising: obtaining a timing advance (TA) measurement with respect to a base station; receiving a plurality of reference signal (RS) transmissions from the base station with a corresponding plurality of receive beams; determining, based on said receiving of the plurality of RS transmissions, an angle of arrival (AoA) estimation; and determining a location of the UE based on the TA measurement and the AoA estimation.

Example 12 includes the method of example 11 or some other example herein, wherein the plurality of RS transmissions comprise: channel state information-reference signal (CSI-RS) or synchronization signal block (SSB) transmissions.

Example 13 includes the method of example 11 or some other example herein, wherein the TA measurement is a first TA measurement, the base station is a first base station, and the method further comprises: obtaining the second TA measurement with respect to a second base station; and determining the location of the UE based further on the second TA measurement.

Example 14 includes a method of operating a user equipment (UE), the method comprising: storing a data structure having a plurality of measurements associated with a respective plurality of coordinate sets; performing a first measurement; selecting a stored measurement from the plurality of measurements that corresponds to the first measurement; and determining a location of the UE based on a coordinate set associated with the stored measurement.

Example 15 includes a method of example 14 or some other example herein, further comprising: performing the plurality of measurements; associating the plurality of measurements with the respective plurality of coordinate sets; and populating the data structure based on said associating the plurality of measurements with the respective plurality of coordinate sets.

Example 16 includes the method of example 14 or some other example herein, further comprising: transmitting, to a location server, a request for measurement-location data of an area; receiving, from the location server in response to the request, the data structure, wherein the respective plurality of coordinate sets are within the area.

Example 17 includes the method of example 14 or some other example herein, wherein the one or more measurements comprise timing advance (TA) measurements or signal strength measurements.

Example 18 includes a method of operating a user equipment (UE), the method comprising: obtaining a first timing advance (TA) measurement acquired from a base station at a first UE location; obtaining a second TA measurement that acquired from the base station at a second UE location; and estimating a location of the base station based on the first TA measurement, the second TA measurement, the first UE location, and the second UE location.

Example 19 includes the method of example 18 or some other example herein, wherein estimating the location comprises: performing a weighted nonlinear least squares operation based on the first TA measurement performed at the first coordinate set and the second TA measurement performed at the second coordinate set.

Example 20 includes the method of example 18 or some other example herein, wherein estimating the location comprises: using an extended Kalman filter based on the first TA measurement acquired at the first UE location and the second TA measurement acquired at the second UE location.

Example 21 includes a method of operating a user equipment (UE), the method comprising: determining a plurality of reference signal time difference (RSTD) measurements with respect to a first base station and a second base station at a plurality of UE locations; estimating a location of the first base station or the second base station based on the plurality of RSTD measurements and the plurality of UE locations.

Example 22 includes the method of example 21 or some other example herein, further comprising: estimating, based on the plurality of RSTD measurements, a difference in a clock bias of the first base station and a clock bias of the second base station.

Example 23 includes the method of example 21 or 22 or some other example herein, further comprising: using a weighted non-linear least squares (WNLS) technique or an extended Kalman filter (EKF) technique in: estimating the location of the first base station or the second base station; or estimating the difference in the clock bias of the first base station and the clock bias of the second base station.

Example 24 includes a method of operating a location server, the method comprising: receiving, from one or more user equipments (UEs), measurements performed at a plurality of UE locations; receiving, from a first UE, a request that identifies an area; transmitting, to the first UE, a response that includes a set of measurements from one or more UE locations within the area.

Example 25 includes the method of example 24 some other example herein, wherein the measurements comprise: timing advance measurements, angle of arrival measurements, signal strength measurements, or reference signal time difference (RSTD) measurements.

Example 26 includes the method of example 24 some other example herein, wherein the report associates each measurement of the set of measurements with a respective UE location.

Example 27 may include an apparatus comprising means to perform one or more elements of a method described in or related to any of examples 1-28, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-28, or any other method or process described herein.

Example 29 may include an apparatus comprising logic, modules, or circuitry to perform one or more elements of a method described in or related to any of examples 1-28, or any other method or process described herein.

Example 30 may include a method, technique, or process as described in or related to any of examples 1-28, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-28, or portions thereof.

Example 32 may include a signal as described in or related to any of examples 1-28, or portions or parts thereof.

Example 33 may include a datagram, information element, packet, frame, segment, PDU, or message as described in or related to any of examples 1-28, or portions or parts thereof, or otherwise described in the present disclosure.

Example 34 may include a signal encoded with data as described in or related to any of examples 1-28, or portions or parts thereof, or otherwise described in the present disclosure.

Example 35 may include a signal encoded with a datagram, IE, packet, frame, segment, PDU, or message as described in or related to any of examples 1-28, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of examples 1-28, or portions thereof.

Example 37 may include a computer program comprising instructions, wherein execution of the program by a processing element is to cause the processing element to carry out the method, techniques, or process as described in or related to any of examples 1-28, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause a baseband processor to:
   determine a mobility characteristic of a user equipment (UE);
   determine a size of a time window based on the mobility characteristic;
   obtain, within the time window, a first timing advance (TA) measurement with respect to a first base station that is at a first location;
   obtain, within the time window, a second TA measurement with respect to a second base station that is at a second location; and
   determine a location of the UE based on the first TA measurement, the second TA measurement, the first location, and the second location.

2. The one or more non-transitory, computer-readable media of claim 1, wherein the first base station is an evolved node B (eNB) and the second base station is a next-generation node B (gNB).

3. The one or more non-transitory, computer-readable media of claim 1, wherein the instructions, when executed, further cause the baseband processor to:
   obtain the first TA measurement using a first subscriber identity module (SIM); and
   obtain the second TA measurement using a second SIM.

4. The one or more non-transitory, computer-readable media of claim 1, wherein the instructions, when executed, further cause the baseband processor to:
   obtain a third measurement with respect to a third base station.

5. The one or more non-transitory, computer-readable media of claim 1, wherein the instructions, when executed, further cause the baseband processor to:
   determine the first location of the first base station; and
   determine the second location of the second base station.

6. The one or more non-transitory, computer-readable media of claim 1, wherein the instructions, when executed, further cause the baseband processor to:
   determine the first TA measurement is concurrent with the second TA measurement; and
   use the first TA measurement and the second TA measurement to determine the location of the UE based on determination that the first TA measurement is concurrent with the second TA measurement.

7. The one or more non-transitory, computer-readable media of claim 6, wherein the instructions, when executed, further cause the baseband processor to:
   determine the first TA measurement is concurrent with the second TA measurement based on the first TA measurement and the second TA measurement obtained within the time window.

8. The one or more non-transitory, computer-readable media of claim 1, wherein to obtain the first TA measurement the baseband processor is to:
   trigger a random access channel (RACH) procedure with the first base station.

9. The one or more non-transitory, computer-readable media of claim 8, wherein the instructions, when executed, further cause the baseband processor to:
   obtain the first TA measurement using a first subscriber identity module (SIM); and
   obtain the second TA measurement using a second SIM.

10. The one or more non-transitory, computer-readable media of claim 9, wherein the instructions, when executed, further cause the baseband processor to:
    identify a period of time in which the second SIM will not use a transmitter of the UE; and
    trigger the RACH procedure within the period of time.

11. A baseband processor comprising:
    processing circuitry to:
    generate, for transmission to a location server, a request for measurement-location data of an area;
    receive, from the location server in response to the request, a data structure having a plurality of measurements associated with a respective plurality of coordinate sets, wherein the respective plurality of coordinate sets are within the area and the plurality of measurements include timing advance (TA) measurements;
    perform a first TA measurement;
    compare the first TA measurement to the plurality of measurements;
    select, based on comparison of the first TA measurement to the plurality of measurements, a second measurement from the plurality of measurements that corresponds to the first TA measurement; and
    determine a location of a user equipment (UE) based on a coordinate set associated with the second measurement; and interface circuitry coupled with the processing circuitry to enable communication.

12. The baseband processor of claim 11, wherein the plurality of measurements further comprise signal strength measurements.

13. A method of operating a location server, the method comprising:
- receiving, from one or more user equipments (UEs), a plurality of measurements performed at a plurality of UE locations, wherein the plurality of measurements include timing advance (TA) measurements;
- receiving, from a first UE, a request that identifies an area;
- identifying, from the plurality of UE locations, one or more UE locations within the area;
- selecting, from the plurality of measurements, one or more measurements that respectively correspond to the one or more UE locations with the area, wherein the one or more measurements include a TA measurement; and
- transmitting, to the first UE, a response that includes the one or more measurements that respectively correspond to the one or more UE locations within the area.

14. The method of claim 13, wherein the plurality of measurements further comprise: angle of arrival measurements, signal strength measurements, or reference signal time difference (RSTD) measurements.

15. The method of claim 13, wherein the response associates each measurement of the one or more measurements with a respective UE location.

* * * * *